US006809838B1

(12) United States Patent
Gilman et al.

(10) Patent No.: US 6,809,838 B1
(45) Date of Patent: Oct. 26, 2004

(54) TRANSFORMS FOR DISPLAY OR PRINTING DIGITAL IMAGES

(75) Inventors: Paul B. Gilman, Penfield, NY (US); John F. Hamilton, Jr., Rochester, NY (US); Edward J. Giorgianni, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 882 days.

(21) Appl. No.: 09/691,866

(22) Filed: Oct. 19, 2000

(51) Int. Cl.$^7$ .............................. G06F 15/00; G06F 1/00
(52) U.S. Cl. ......................... 358/1.9; 358/2.1; 358/3.23; 358/502; 358/509; 358/520
(58) Field of Search .......................... 358/1.9, 2.1, 323, 358/502, 509, 520

(56) References Cited

U.S. PATENT DOCUMENTS

| | | | |
|---|---|---|---|
| 4,792,518 A | * 12/1988 | Kuwashima et al. | 430/505 |
| 5,225,867 A | * 7/1993 | Nagata et al. | 355/401 |
| 5,300,381 A | * 4/1994 | Buhr et al. | 430/30 |
| 5,729,360 A | * 3/1998 | Kita et al. | 358/500 |
| 6,374,027 B1 | * 4/2002 | Onishi et al. | 385/123 |
| 6,477,271 B1 | * 11/2002 | Cooper et al. | 382/167 |

OTHER PUBLICATIONS

"The Tone Reproduction of Colour Photographic Materials" by R. W. G. Hunt et al., Journal of Photographic Science, vol. 17, 1969, pp. 198–204.

* cited by examiner

Primary Examiner—Madelene Nguyen
Assistant Examiner—Michael Burleson
(74) Attorney, Agent, or Firm—Raymond L. Owens

(57) ABSTRACT

A method for constructing a transform for a predetermined display or printer, such printer or display being adapted to form a color image, on a particular medium, with extended chroma values while maintaining existing luminance values, the input to the transform including an input color digital image produced by a particular image capture device, the method includes providing a luminance reproduction curve in response to the input color digital image which, for any input luminance value, will produce an output luminance value, the luminance reproduction curve being selected to preserve highlight and midtone contrast, and shadow detail from the input color digital image; providing a plurality of selective luminance independent chromatic reproduction curves in response to the input color digital image which, for any input chroma value, will produce an output chroma value; and the chromatic reproduction curves being selected so that each curve is a function of the visual density range of the display or medium and the image chroma values wherein small chroma values remain unchanged and large chroma values are modified to extend chroma values while maintaining existing luminance values for a particular device or medium whereby a user can select one or more of the chromatic reproduction curves which, in combination with the luminance reproduction curve, produces color digital images so that a selected printer or display can form a color image, on a particular medium, with extended chroma values.

17 Claims, 3 Drawing Sheets

TRANSFORMS FOR DISPLAY OR PRINTING DIGITAL IMAGES

CROSS REFERENCE TO RELATED APPLICATIONS

The present invention is related to commonly assigned U.S. patent application Ser. No. 08/897,868 filed Jul. 21, 1997 to Gilman et al.; U.S. patent application Ser. No. 09/057,903 filed Apr. 9, 1998 to Gilman et al.; and U.S. patent application Ser. No. 09/578,463 filed May 25, 2000 to Gindele et al., the disclosures of which are incorporated herein by reference.

FIELD OF THE INVENTION

This invention relates to a method of constructing nonlinear chromatic transforms for improving the display or making color images on a particular medium from color digital images.

BACKGROUND OF THE INVENTION

In the process of capturing digital images and viewing prints from such digital images, flare is introduced which degrades the viewed image in at least two ways. The first is by ambient light at the time of capture, and the second is by ambient light at the time of viewing of the print or display. In a typical silver halide photographic process, flare takes place in three ways. The first is at the time of exposure. The second is when the optical print is made. The third is when the optical print is viewed.

There have been a number of techniques for improving the tone reproduction of digital images, see for example, U.S. Pat. Nos. 4,792,518 and 5,300,381. For a discussion of tone reproduction and the effect of flare on print quality, see "The Tone Reproduction of Colour Photographic Materials," R. W. G. Hunt, I. T. Pitt, and P. C. Ward, J. Photog. Sci., 17:198(1969). Flare light is generally ambient light, which degrades the viewed image on the print.

As set forth in the above disclosures, a number of techniques are disclosed which require that the media be silver halide photographic media and the techniques for making the images are very complex. The publication by Hunt et al describes the "ideal system" for printing photographic images to correct for camera flare, printer flare, and viewing flare but offered no practical way to implement this theoretical tone reproduction curve because of the lack of digital imaging tools and the limitations of the materials available in 1969.

It has been the practice, in dealing with tone scale improvements, to treat only one tone scale, which includes all colors along with black and white information. One of the problems of changing the tone reproduction of digital images to reduce the loss in image quality from viewing flare is that sometimes shadow detail is lost because all of the colors along with black and white digital data are changed equally.

SUMMARY OF THE INVENTION

It is an object of the present invention to construct a transform for a predetermined medium for producing improved color images on a display or printer or on a particular medium which overcomes image degradation by viewing flare.

It is another object of the present invention to provide transforms for improving the image quality of digital images on displays with a wider dynamic range than previously available.

These objects are achieved by a method for constructing a nonlinear transform for a predetermined display or printer, such printer or display being adapted to form a color image, on a particular medium, the input to the transform including an input color digital image produced by a particular image capture device, the method comprising the steps of:

a) providing a luminance reproduction curve in response to the input color digital image which, for any input luminance value, will produce an output luminance value, the luminance reproduction curve being selected to preserve highlight and midtone contrast, and shadow detail from the input color digital image;

b) providing a plurality of chromatic reproduction curves, which are luminance independent, in response to the input color digital image which, for any input chroma value, will produce an output chroma value; and c) the chromatic reproduction curves being selected so that each curve is a function of the visual density range of the display or medium and the image chroma values, wherein small chroma values remain unchanged and large chroma values are modified to increase or decrease chroma values while maintaining existing luminance values for a particular device or medium whereby a user can select one or more of the chromatic reproduction curves which, in combination with the luminance reproduction curve, produces color digital images so that a selected printer or display can form a color image, on a particular medium, with modified chroma values.

By substantially independently changing the tone scale of chroma data separately from luminance data, shadow detail may be preserved yet still realize the desirable effect of an increase in contrast of the chroma digital data which offsets viewing flare.

A feature of the present invention is that transforms are produced which can used by a printer or display for forming a color image on a particular medium with improved multiple chromatic reproductions, ensuring that such images provide esthetically pleasing results which facilitate better utilization of the dynamic range of the print media while protecting shadow detail from the effects of viewing flare.

The present invention solves a flare problem by a method, which has not been available to optical printing of silver halide images. Flare can be a function of ambient light which takes place at the time of camera exposure and as well as ambient light when viewing the print or display. It is therefore an advantage of the present invention to produce a set of transforms which can be used either in soft displays for displaying images, or for use in printing black and white or colored images and which minimizes the effects of flare and permits a better utilization to the dynamic range of the print media. These transforms can be readily implemented in a computing system. Such a computing system can include a microprocessor, which in combination with a digital printer, can produce continuous tone prints which are esthetically pleasing.

Heretofore, in silver halide reproduction optical printers, generally both luminance and chrominance are adjusted simultaneously to change the color of an image to be printed resulting in an increase in contrast which changes both luminance and chrominance simultaneously. The present invention recognizes that in digital image processing luminance and chrominance can be independently adjusted to preserve shadow detail and improved colorfullness thereby producing more esthetically pleasing color images.

Organic electroluminescent devices such as organic light emitting diode (OLED) displays represent a new technology for producing displays and the present invention is particularly suitable for use in constructing transforms for such displays.

DETAILED DESCRIPTION OF THE INVENTION

Figure 1B:
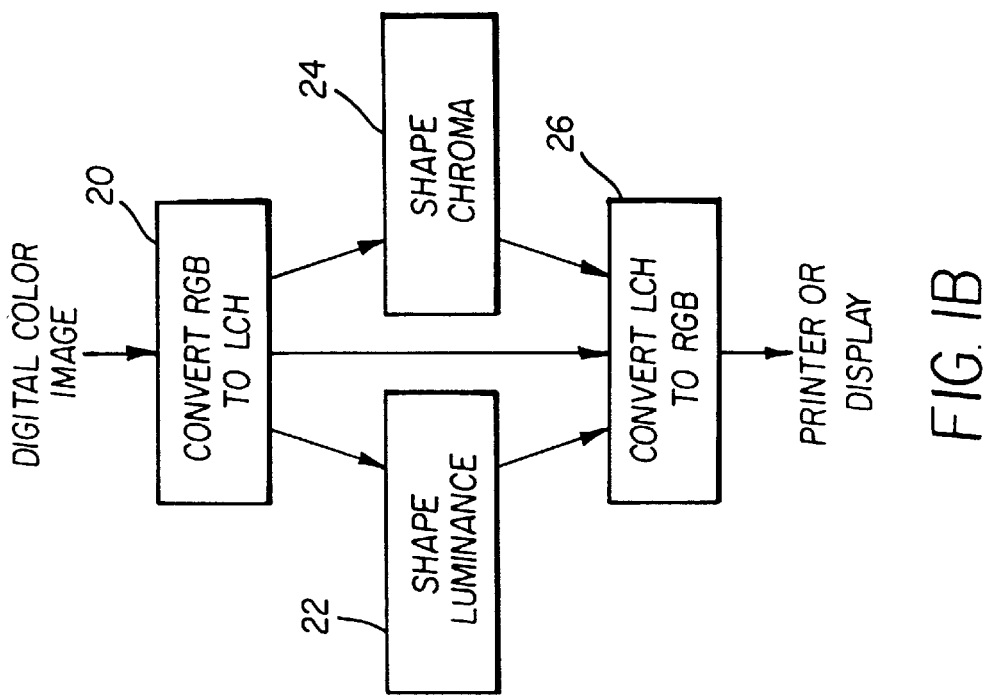
FIG. 1B is a block diagram showing the processing using a transform constructed in accordance with the present invention in a luminance-chroma-hue coordinate system.
Figure 1A:
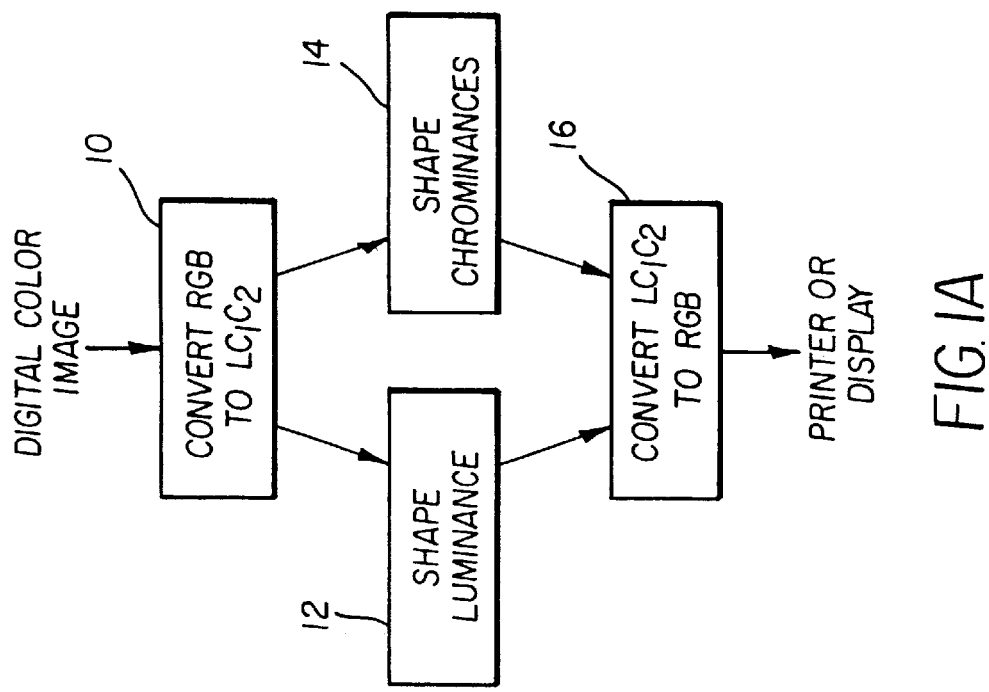
FIG. 1A is block diagram showing the processing using transform constructed in accordance with the present invention in a luminance-chrominance coordinate system.

In FIG. 1A, a high level diagram shows that the process modifying a digital image's tone and color reproduction has four steps. The first step (block 10) shows the conversion of the digital image's color data (typically RGB) into a luminance and chrominance form. Block 12, shaping luminance, treats the neutral, or black and white, portion of the image information. Shaping means that a transform is applied to input luminance values to produce output luminance values. Block 14, shaping chrominance, treats the non-neutral, or color-only, portion of the image information. Again, shaping means that a transform is applied to input chrominance values to produce output chrominance values. The final step, block 16, shows the luminance and chrominance information being converted back to RGB.

FIG. 1B shows the same process being carried out in an alternative intermediate representation. Block 20 shows the RGB image data being converted into a luminance, chroma, hue representation. Block 22 shows the shaping of luminance, as was done in block 12. Block 24 shows the shaping of chroma, and block 26 shows the conversion of luminance, chroma, and hue back into RGB.

It is understood that the previous transforms may be carried out in a plurality of coordinate systems. For example, the CIELAB (CIE 1978) luminance-chrominance coordinate system could be used in FIG. 1A. As an alternative, the directly related cylindrical luminance-chroma-hue coordinates 10 (lightness L*, metric chroma $C^*_{ab}$, and metric hue $h^*_{ab}$) could be used in FIG. 1B.

The present invention has recognized that, with digital imaging, a luminance aim curve and a chromatic aim curve are produced which will minimize the effects of flare and permits enhanced color saturation without losing shadow detail. By independently changing the tone scale of color-only digital data separately from the black and white digital data, neutral shadow detail may be preserved yet still realize the desirable effect of an increase in contrast of the color digital data to offset viewing flare. By saying that the chromatic tone scale is independent of luminance, in this disclosure it is meant that a pixel's color-only values, whether expressed as chrominances or as hue and chroma, can be numerically changed without simultaneously changing the pixel's luminance value. Although the two shaping operations, blocks 12, 14 in FIG. 1A and blocks 22, 24 in FIG. 1B, involve numerically independent transforms, it is understood that, in practice, the actual transforms can be selected jointly.

Let a digital color image be processed to achieve typical tone reproduction aims. Following FIG. 1B, let the RGB color image data be converted into a luminance, hue, chroma form (block 20). For output devices having extended dynamic range, the luminance reproduction can be transformed, block 22, to have higher shadow contrast. See, for example, above-identified commonly assigned U.S. patent application Ser. No. 08/057,903 filed Apr. 9, 1998 to Gilman et al. Referring to block 24, let the following equation denote the initial chroma reproduction curve resulting from said typical tone reproduction aims:

$$y=F(x) \qquad (1)$$

in which:

x denotes input chroma; and y denotes output chroma.

The present invention constructs a new transform to change input chroma values into modified output chroma values that produce a more pleasing image.

As a preliminary step, the present invention requires a chroma boost function B(y) that is defined as follows:

$$B(y) = \begin{bmatrix} 0 & \text{if } y < y_0 - h \\ \frac{\text{Tan}(\theta)}{4h}[y-(y_0-h)^2] & \text{if } y_0 - h \le y \le y_0 + h \\ \text{Tan}(\theta)(y-y_0) & \text{if } y_0 - h < y \end{bmatrix} \qquad (2)$$

in which:

y denotes any chroma value;

$y_0$ denotes a particular chroma value;

θ denotes a particular angle of inclination, positive or negative; and h denotes a particular small increment of chroma.

Figure 2A:
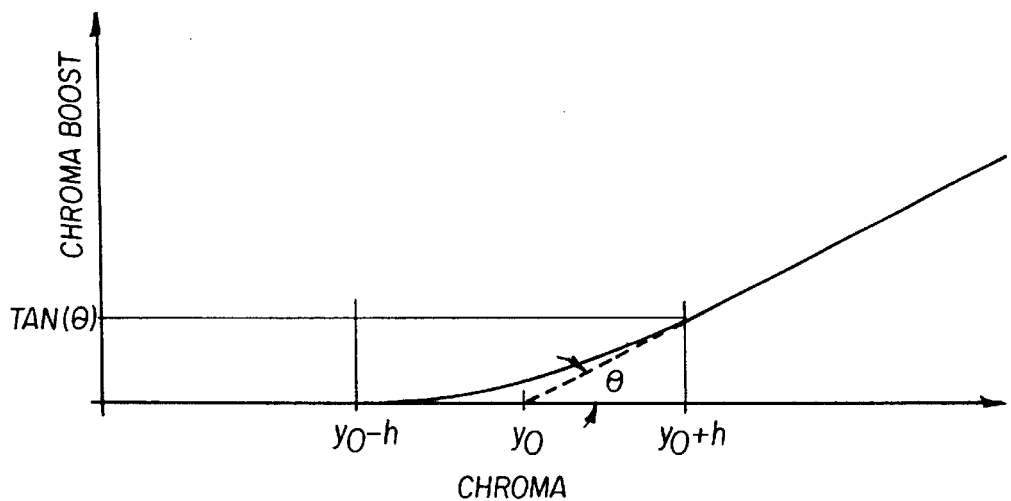
FIG. 2A is a graph showing a particular functional relationship between original chroma values and their corresponding chroma boost values.
Figure 2B:
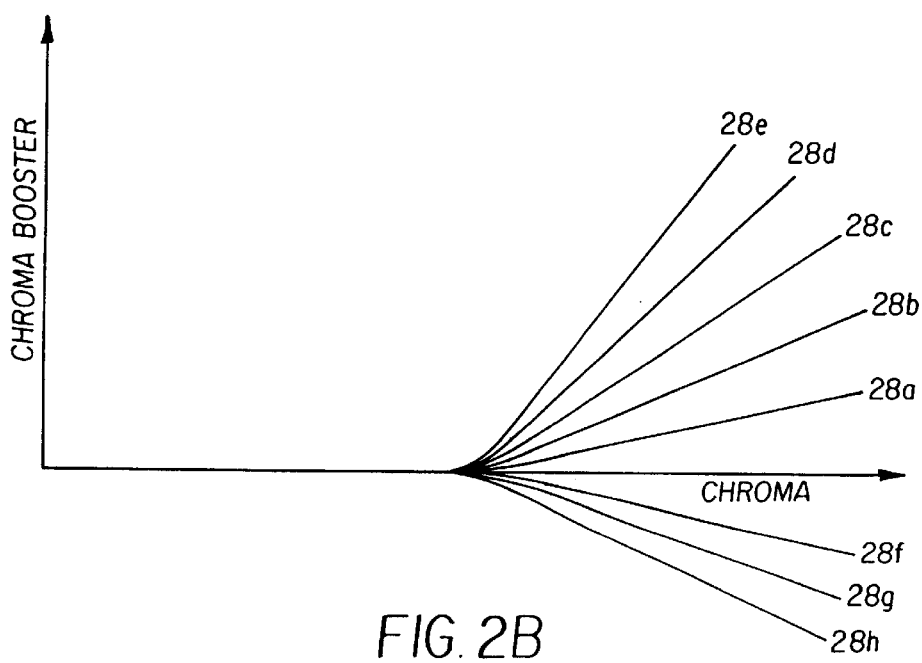
FIG. 2B is a graph showing a family of functional relationships between original chroma values and their corresponding chroma boost values.

In FIG. 2A is shown a graph of such a boost function. In FIG. 2B is shown a set or family of boost curves having the same values of $y_0$ and h, but differing values of θ. The curves 28a–e, respectively, show increasing amounts of chroma boost, while curves 28f–h show decreasing and negative amounts of boost (causing chroma reduction). Useful values of $y_0$, θ, and h are 40, 30°, and 10, respectively.

When the print boost value B(y) is added to the value of y itself, a modified chroma value is obtained as shown in the following equation:

$$z=y+B(y) \qquad (3)$$

in which:

y denotes original output chroma value; and z denotes modified output chroma value.

Figure 3:
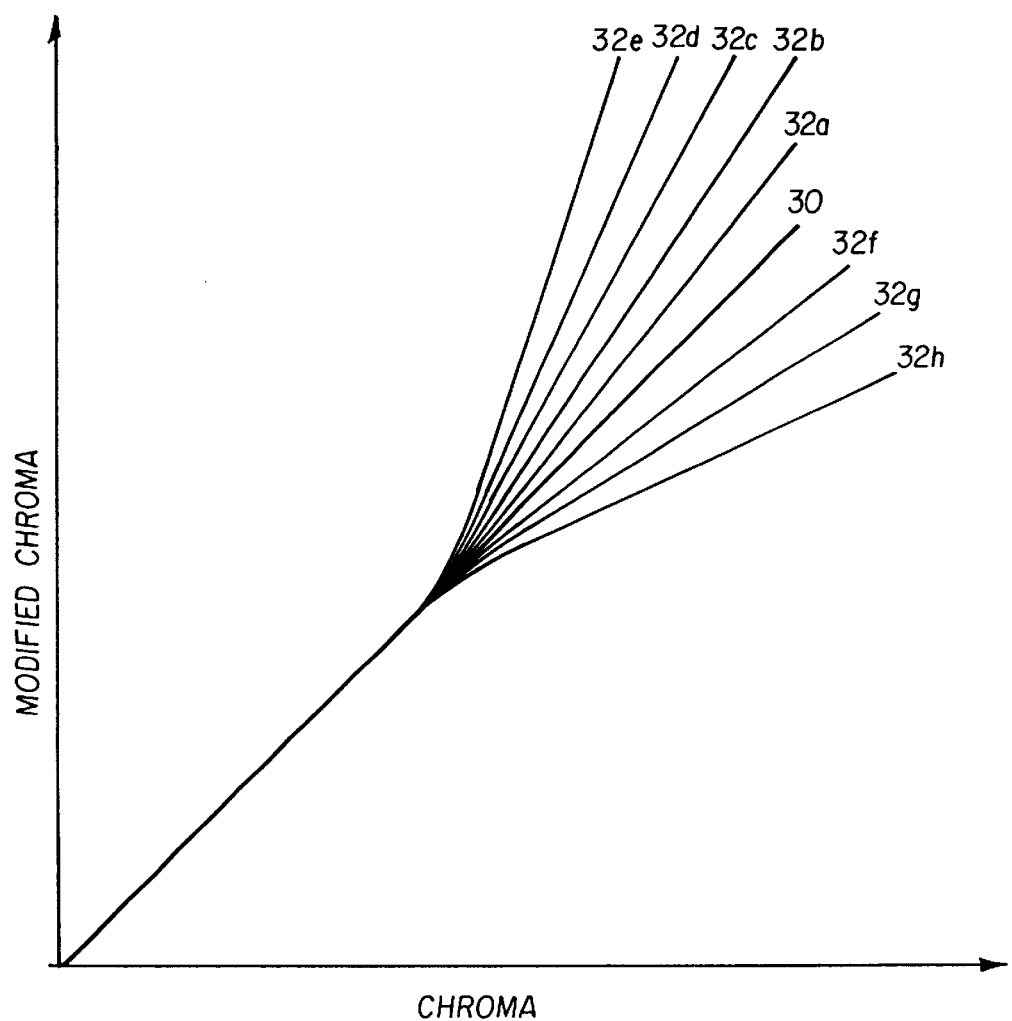
FIG. 3 is a graph showing a family of chroma reproduction curves corresponding to the family of chroma boost functions shown in FIG. 2B.

A set or family of such relationships is shown graphically in FIG. 3. In each case, the boost curves 28a–h (FIG. 2B) have been added to the graph 30 of the equation z=y to produce corresponding curves 32a–h (FIG. 3).

Substituting equation (1) into equation (3) a new equation is formed:

$$z=F(x)+B(F(x)) \qquad (4)$$

in which:

x denotes input chroma; and z denotes modified output chroma.

The new function, F(x)+B(F(x)), defines a new chromatic reproduction aim curve which may be applied along with the new luminance reproduction curve.

Those skilled in the art will appreciate that a very practical output device can be a thermal printer, which uses a particular thermal print medium, which receives sublimable dye. Other output devices can be an ink jet printer, an electrophotographic printer, or a digital silver halide printer.

In accordance with the present invention it should now be clear that one skilled in the art can select an aim curve for a desired medium having a predetermined maximum neutral density. Briefly reviewing, a user selects a luminance aim curve from a family of aim curves for a different medium having a lower predetermined maximum density than that of the desired medium. The aim curve has shadow, midtone, and highlight regions. The user then varies the shadow contrast in the shadow region of the selected aim curve to produce a different aim curve and determines if the varied aim curve for the desired medium that has an improved shadow contrast that will produce prints with reduced flare and permits a better fit of the dynamic range of the original scene to the dynamic range of the medium.

Since flare will still mask luminance detail having high spatial frequency content, then, depending on the image, there is often more dynamic range in the output device than can be fully utilized by luminance. This being the case, the associated chromatic reproduction curve is then given a chromatic boost to more fully utilize the dynamic range and to enhance color saturation.

Transforms made in accordance with the present invention can be stored in a computer readable storage medium. When the transform is for a printer, it can be used to produce any desired number of prints from a printer, which uses the particular print medium. The computer readable storage medium may comprise, for example; magnetic storage media such as magnetic disc (such as a floppy disc) or magnetic tape; optical storage media such as optical disc, optical tape drive, or machine readable bar code; solid state electronic storage devices such as random access memory (RAM), or read only memory (ROM); or any other physical device or medium employed to store a computer program.

The following examples depict how the present invention can be practiced. Those skilled in the art will appreciate that, by careful selection by a user, the functional equivalent of the equations (1) through (4) can be used to produce transforms in accordance with the present invention.

Print media, such as thermal print and ink jet receivers, can produce images with a wider dynamic range than previously available. The present invention makes it possible to produce a new transform, which will produce tone reproduction curves that are capable of providing an even higher level of image quality than previously obtainable. In accordance with the present invention, it can be a simple task to implement these techniques to optimize tone reproduction curve adjustments.

In accordance with the present invention, the original scene image is not duplicated, but the tone reproduction of its corresponding digital image is shaped by a Chroma only Transform so as to produce an esthetically pleasing display or print which minimizes flare effects and permits a better fit of the dynamic range of the original scene to the dynamic range of the print media.

EXAMPLE 1

Creation of a Chrominance Only Transform in Adobe Photoshop 4.0

An example of the practice of this invention is as follows:
1. Using Adobe Photoshop 4.0 on a Mackintosh or PC computer, open the digital file of an image to be printed.
2. GO TO IMAGE-MODE and change the image from RGB Color to Lab Color.
3. GO TO WINDOW-SHOW CHANNELS. Leaving the Luminance (or lightness) channel untouched, click on the a* channel to select it.
4. GO TO IMAGE ADJUST CURVES and click on the center point of the straight line that is displayed so that an input of 50% is fixed to result in an output of 50%.
5. Next, click on the bottom left point of that same line and drag it to the right so that an Input value of 15% results in an Output value of 0%.
6. Click on the top right part of that same line and drag it to the left so that an Input of 85% results in an output of 100%.
7. Click OK.
8. Next click on the b* channel and GO TO IMAGE ADJUST CURVES.
9. Click on the center point of the straight line that is displayed to fix that one point so that an Input of 50% is fixed to result in an Output of 50%.
10. Next, click on the bottom left point of that same line and drag it to the right so that an Input value of 15% results in an Output value of 0%.
11. Click on the top right part of that same line and drag it to the left so that an Input of 85% results in an Output of 100%.
12. Click OK.
13. GO TO WINDOWS SHOW CHANNELS and click on the Lab channel to show all channels.
14. GO TO IMAGE-MODE CHANGE and choose RGB COLOR.
15. Send the digital file with this chroma transform to a digital printer after applying an input Profile such as SRGB and an output printer Profile created with Kodak ColorFlow software.
16. Steps 1 through 14 maybe saved as a macro so that one keystroke leads to the operation of all of these functions in one step, in just a few seconds.

It is understood that there are many variations possible in the steps listed above. By separately changing the tone scale of each of the four quadrants of a* and b* it become possible to increase or decrease the separate colors of an image independent of the luminance channel which controls the black and white digital data.

It is also possible, for example, to fix a 30% input to a 30% output to protect certain parts of the color tone scale from highlight to mid tones tone from any change yet allow the rest of the tone scale to be altered to increase only the upper scale contrast of the tone scale These selective steps are a big advantage over previous techniques that change the tone scales of all RGB colors equally because it permits the preservation of shadow and highlight detail in the luminance channel independent of the color tone scales in the chroma channels. Previously, to increase colorfulness, one had to increase the all over contrast of an image, which resulted in more colorfulness but also suffered the loss of shadow and highlight detail.

EXAMPLE 2

Creation of a Chroma Only Transform in Adobe Photoshop 4.0

An example of the practice of this invention is as follows:
1. Using Adobe Photoshop 4.0 on a Mackintosh or PC computer, open the digital file of an RGB image to be printed.
2. GO TO FILTERS and change the image from RGB Color to a LumaChroma color space by selecting menu item ChromaBoost->RGB_to_LumaChroma.
3. GO TO FILTERS and boost the surplus chroma of the image by selecting menu item ChromaBoost->ChromaBoost.
4. GO TO FILTERS and change the image back from the LumaChroma color space to RGB by selecting menu item ChromaBoost->LumaChroma_to_RGB.

In step 2, any luminance chrominance color representation will work. For example, $$L=(R+2*G+B)/4$$

$$C1=128+(-R+2*G-B)/4$$

$$C2=128+(-R+B)/2$$

Notice that the chrominance values should be biased by 128 because Photoshop only displays non-negative code values from 0 to 255.

Likewise, in step 4, the inverse transformation would be:

$R = L - C1 - C2 - 256$ $G = L + C1 - 128$ $B = L - C1 + C2$

In step 3, the ChromaBoost filter is a filter which can be created in Filter Factory (itself, a plug-in distributed with Photoshop). Since step 2 has converted the RGB image into a LumaChroma representation, the red channel is actually luminance, while green and blue are the two chrominance channels (biased by 128). The Filter Factory script for ChromaBoost goes as follows:

(red channel)
put(g-128,1),: unbias chrominance C1
put(b-128,2),: unbias chrominance C2
put(sqr(get(1)*get(1)+get(2)*get(2),3),: current chroma
r: leave luminance unchanged
(green channel)
put(max(get(3)-ctl(0),0),4),: surplus chroma
put(get(3)+get(4)*ctl(1)/(1+ctl(2)),5),: new chroma
128+get(1)*get(5)/(1+get(3)): new chrominance C1
(blue channel)
128+get(2)*get(5)/(1+get(3)): new chrominance C2

The first task in the red channel is to save the unbiased chrominance values in storage locations 1 and 2. Then, storage location 3 is given the chroma value of the current pixel. The red value is then returned to the red channel, as it represents the pixel's luminance value, which is not to be changed. The first task in the green channel is to use the control slider ctl(0) to compute surplus chroma. The user sets the value of ctl(0) to be the largest chroma value to be remain unchanged by this procedure. So, if the user wanted any chroma less than 30 to stay fixed, the user would set the slider position of ctl(0) to produce the value 30. If the current pixel had a chroma value of 40, then the difference of these values, 10, would be the surplus chroma. It is only the surplus chroma, which is to be boosted. Notice that if the current pixel had a chroma value of 20, the surplus chroma would be set to zero. The control sliders 1 and 2 are used to specify the boost factor applied to the surplus chroma. Storage location 5 is given the new chroma value, which equals the current chroma value (from storage 3), plus the surplus chroma times the ratio ctl(1)/(1+ctl(2)). The denominator value of ctl(2) has a 1 added to it to prevent the user from creating a zero-divide error. The final tasks are to scale the original chrominance values by the ratio of the new chroma divide by the original chroma (again the extra 1 in the denominator prevents a possible zero-divide). The bias of 128 is also reintroduced in these final steps.

A computer program product which includes transforms made in accordance with the present invention can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention.

PARTS LIST

| | |
|---|---|
| 10 | image capture device characterization test chart |
| 12 | image capture device |
| 14 | capture device image memory |
| 16 | digital computer |
| 20 | printer |
| 22 | printer image memory |
| 24 | reflection print of test chart 18 |
| 26 | scene |
| 28 | digital computer memory |
| 28a | positive boost curve |
| 28b | positive boost curve |
| 28c | positive boost curve |
| 28d | positive boost curve |
| 28e | positive boost curve |
| 28f | negative boost curve |
| 28g | negative boost curve |
| 28h | negative boost curve |
| 30 | chromatic transfer curve |
| 32a | chromatic transfer curve |
| 32b | chromatic transfer curve |
| 32c | chromatic transfer curve |
| 32d | chromatic transfer curve |
| 32e | chromatic transfer curve |
| 32f | chromatic transfer curve |
| 32g | chromatic transfer curve |
| 32h | chromatic transfer curve |

What is claimed is:

1. A method for constructing a nonlinear transform for a predetermined display or printer, such printer or display being adapted to form a color image, on a particular medium, the input to the transform including an input color digital image produced by a particular image capture device, the method comprising the steps of:

a) providing a luminance reproduction curve in response to the input color digital image which, for any input luminance value, will produce an output luminance value, the luminance reproduction curve being selected to preserve highlight and midtone contrast, and shadow detail from the input color digital image;

b) providing a plurality of chromatic reproduction curves, which are luminance independent, in response to the input color digital image which, for any input chroma value, will produce an output chroma value; and c) the chromatic reproduction curves being selected so that each curve is a function of the visual density range of the display or medium and the image chroma values, wherein small chroma values remain unchanged and large chroma values are modified to increase or decrease chroma values while maintaining existing luminance values for a particular device or medium whereby a user can select one or more of the chromatic reproduction curves which, in combination with the luminance reproduction curve, produces color digital images so that a selected printer or display can form a color image, on a particular medium, with modified chroma values.

2. The method of claim 1 wherein the chromatic reproduction curves are selected to modify colors in particular portions of a color space.

3. The method of claim 1 wherein the contrast of the shoulder of each of the chromatic reproduction curves is gradually increased to reduce viewing flare.

4. The method of claim 1 wherein, when the transform is for a printer, further including using the transform to produce a desired number of prints from a printer which uses the particular print medium for which the transform is configured.

5. The method of claim 1 wherein the image capture device is a digital camera and the particular medium is a thermal print medium.

6. The method of claim 1 wherein the printer is an ink jet printer.

7. The method of claim 1 wherein the printer is an electrophotographic printer.

8. The method of claim 1 wherein the display is an OLED display.

9. A transform made in accordance with claim 1.

10. A method for constructing a nonlinear transform for a predetermined display or printer, such printer or display being adapted to form a color image, on a particular medium, the input to the transform including an input color digital image produced by a particular image capture device, the method comprising the steps of:

a) providing a luminance reproduction curve in response to the input color digital image which, for any input luminance value, will produce an output luminance value, the luminance reproduction curve being selected to preserve highlight and midtone contrast, and shadow detail from the input color digital image;

b) providing a plurality of selective luminance independent chromatic reproduction curves in response to the input color digital image which, for any input chroma value, will produce an output chroma value; and c) the chromatic reproduction curves being selected so that each curve is a function of the visual density range of the display or medium and the image chroma values wherein small chroma values remain unchanged and large chroma values are modified so as to satisfies the following relationship:

$$G(x)=F(x)+B(F(x))$$

wherein:

F(x) is a conventional chromatic reproduction scale and wherein x is an image chroma value; and B(F(x)) is a boost function, which satisfies the relationship:

$$B(y) = \begin{cases} 0 & \text{if } y < y_0 - h \\ \frac{\text{Tan}(\theta)}{4h}[y - (y_0 - h)^2] & \text{if } y_0 - h \leq y \leq y_0 + h \\ \text{Tan}(\theta)(y - y_0) & \text{if } y_0 - h < y \end{cases}$$

in which:

y denotes any chroma value;

$y_0$ denotes a particular chroma value;

θ denotes a particular angle of inclination, positive or negative; and h denotes a particular small increment of chroma value, and whereby a user can select one or more of the chromatic reproduction curves which, in combination with the luminance reproduction curve, produces color digital images so that a selected printer or display can form a color image, on a particular medium, with enhanced or diminished chroma values.

11. The method of claim 2 wherein the chromatic reproduction curves are selected to modify colors in particular portions of a color space.

12. The method of claim 2 wherein the contrast of the shoulder of each of the chromatic reproduction curves is gradually increased to reduce viewing flare.

13. The method of claim 2 wherein, when the transform is for a printer, further including using the transform to produce a desired number of prints from a printer which uses the particular print medium for which the transform is configured.

14. The method of claim 2 wherein the image capture device is a digital camera and the particular medium is a thermal print medium.

15. The method of claim 2 wherein the printer is an ink jet printer.

16. The method of claim 2 wherein the printer is an electrophotographic printer.

17. The method of claim 2 wherein the display is an OLED display.

* * * * *